US007066613B2

(12) United States Patent
Vishwamitra

(10) Patent No.: US 7,066,613 B2
(45) Date of Patent: Jun. 27, 2006

(54) SOUND AND LIGHT APPARATUS

(75) Inventor: Tejaswi Vishwamitra, Cincinnati, OH (US)

(73) Assignee: Broan-Nutone LLC, Hartford, WI (US)

( * ) Notice: Subject to any disclaimer, the term of this patent is extended or adjusted under 35 U.S.C. 154(b) by 244 days.

(21) Appl. No.: 10/633,244

(22) Filed: Aug. 1, 2003

(65) Prior Publication Data

US 2005/0024857 A1 Feb. 3, 2005

(51) Int. Cl.
*H04M 1/22* (2006.01)

(52) U.S. Cl. ......................... 362/86; 362/343; 362/410

(58) Field of Classification Search .................. 362/86, 362/253, 236, 237, 249, 276, 290, 20, 341–344, 362/395, 414, 412, 410, 96, 260, 431; 181/153, 181/156, 199, 141, 148; 381/387, 182, 336, 381/386; 340/907, 928
See application file for complete search history.

(56) References Cited

U.S. PATENT DOCUMENTS

| | | | | |
|---|---|---|---|---|
| 2,278,835 A | | 4/1942 | Crowley | |
| 3,023,830 A | | 3/1962 | Hammes | |
| 3,194,952 A | | 7/1965 | Wells | |
| 3,218,446 A | | 11/1965 | Langer | |
| 3,679,845 A | | 7/1972 | Geloso | |
| 3,832,679 A | * | 8/1974 | Foley et al. | 340/928 |
| 4,814,961 A | * | 3/1989 | O'Brien et al. | 362/319 |
| 4,953,223 A | | 8/1990 | Householder | |
| 5,068,773 A | * | 11/1991 | Toth | 362/386 |
| 5,628,558 A | * | 5/1997 | Iacono et al. | 362/288 |
| 5,964,519 A | | 10/1999 | Chun-Ying | |
| 6,042,242 A | | 3/2000 | Chang | |
| 6,060,979 A | * | 5/2000 | Eichsteadt | 340/287 |
| 6,087,938 A | * | 7/2000 | Gitelis et al. | 340/567 |
| 6,236,622 B1 | | 5/2001 | Blackman | |
| 6,345,685 B1 | * | 2/2002 | Wells et al. | 181/153 |
| 6,494,599 B1 | * | 12/2002 | Leen | 362/362 |
| 6,634,768 B1 | * | 10/2003 | McKenzie et al. | 362/253 |
| 6,769,509 B1 | * | 8/2004 | Harwood | 181/199 |

* cited by examiner

*Primary Examiner*—Stephen Husar
*Assistant Examiner*—Hargobind S. Sawhney
(74) *Attorney, Agent, or Firm*—Michael Best & Friedrich LLP

(57) ABSTRACT

A sound and light apparatus including a lamp and a speaker. The sound and light apparatus can be used indoors or outdoors to enhance a landscape plan or an interior design plan. Multiple sound and light apparatuses can be used to further enhance the ambiance of the indoors or outdoors location.

12 Claims, 5 Drawing Sheets

SOUND AND LIGHT APPARATUS

BACKGROUND OF THE INVENTION

Home and business landscaping is a popular project and pastime with home and business owners. Homeowners and business owners can hire a landscaping company to design and implement a plan to enhance the appearance of land surrounding a home or building. Instead of contracting a landscaping company, homeowners and business owners can do the work themselves.

Landscaping around, for example, a patio, a flower bed, a deck, a pool or a building can enhance the appearance of those features and draw attention to them. It can also generally provide for a serene and relaxing environment. Landscaping can encompass many things, such as, the addition of a lighting scheme, a stone or brick wall, fencing, a water fountain, flowers, trees, shrubs, a sound system, etc.

Like other types of outdoor fixtures and features of a building, home, or other property, outdoor lighting and outdoor sound systems have developed significantly over the years. However, new lighting and sound systems are always welcome in the art, regardless of whether adapted for indoor or outdoor use.

SUMMARY OF THE INVENTION

The present invention can be used as a landscaping tool to enhance the appearance and/or environment of a home or business. Some embodiments of the present invention can also be used indoors for interior decoration and room enhancement. In some embodiments, the invention includes a sound and light apparatus having a housing, a speaker mounted in the housing, and a lamp mounted in the housing, wherein the housing includes a plurality of outwardly extending fins such that the fins are positioned to direct sound and light from the housing through the fins.

In some embodiments, the sound and light apparatus can include a housing having a plurality of fins that project outward from the housing, a speaker located within the housing, and a light located within the housing.

Some embodiments of the present invention provide a plurality of sound and light apparatuses to create an entertainment system. Each apparatus can include a housing, a speaker mounted and located within the housing, and a lamp mounted and located within the housing, and an electrical terminal operable to connect to another sound and light apparatus. The entertainment system can include an electronic controller coupled to the plurality of sound and light apparatuses. In some embodiments, at least one of the speakers is separately controllable by the electronic controller to produce different sound than at least one other speaker in the system.

Additional objects and features of the invention are illustrated in the drawings and provided in the subsequent disclosure.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings.

DETAILED DESCRIPTION

Figure 1:
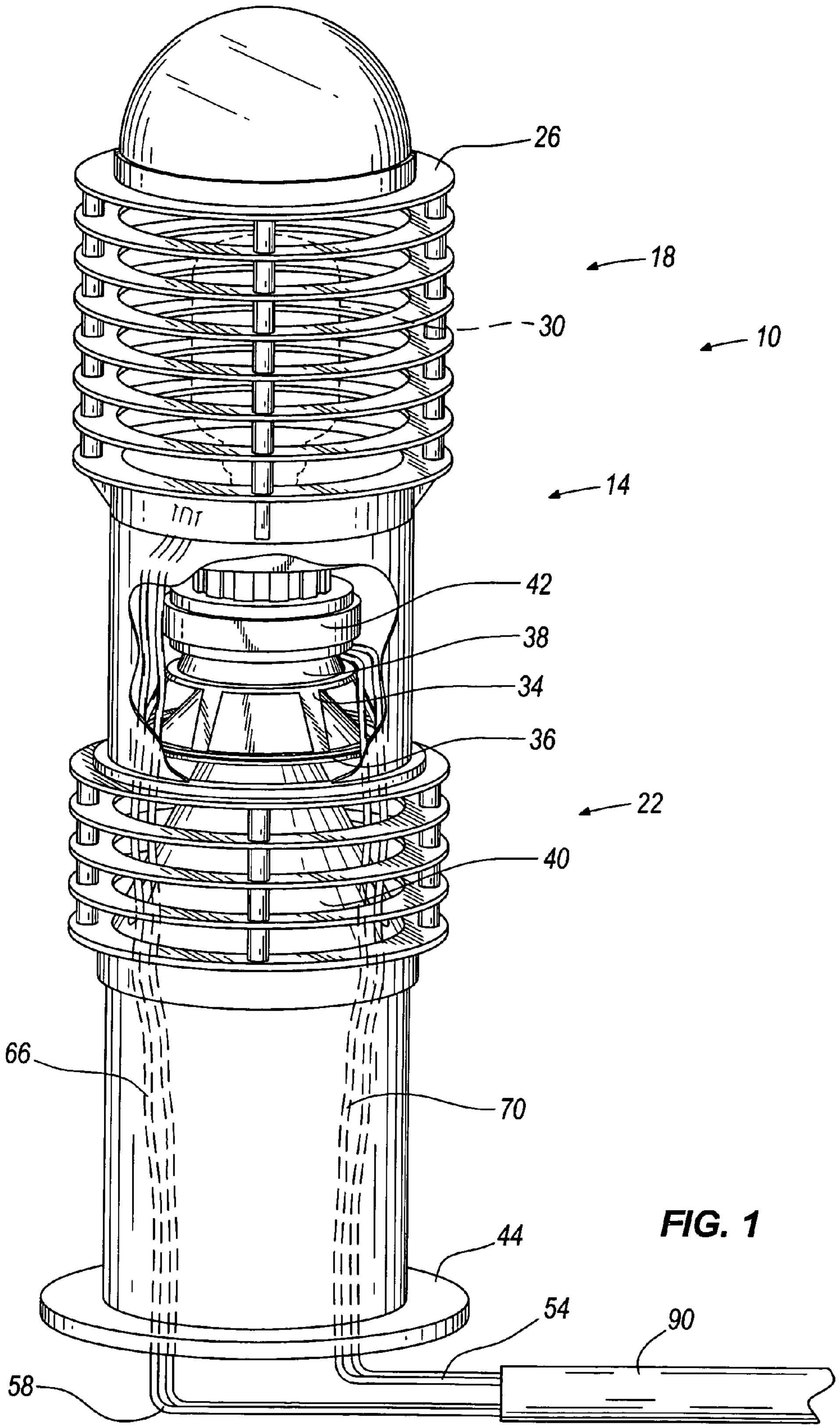
FIG. 1 is a perspective view of a sound and light apparatus according to an exemplary embodiment of the present invention, shown with a cutaway view of a speaker.

Before embodiments of the invention are explained in detail, it is to be understood that the present invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Figure 2:
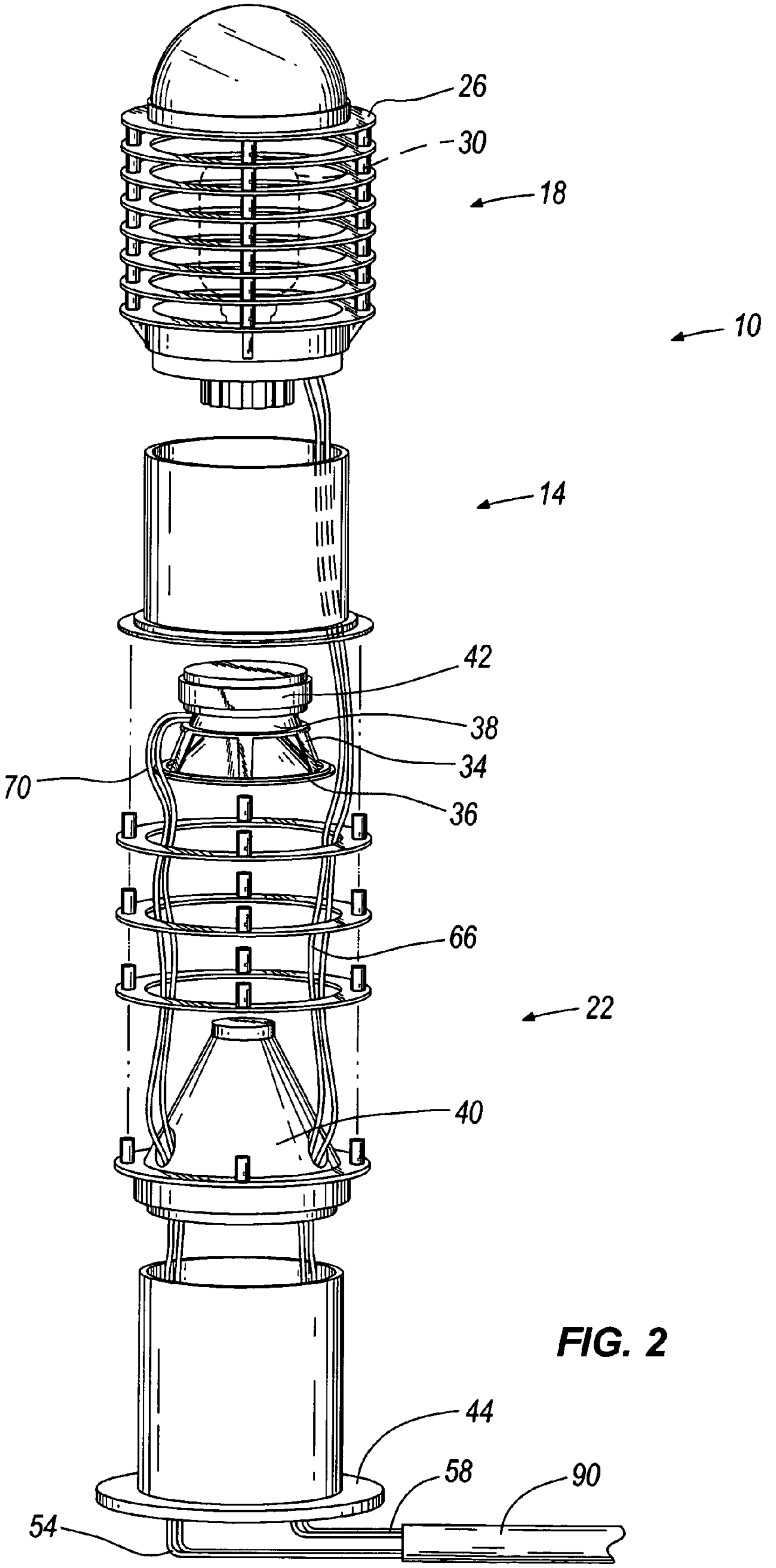
FIG. 2 is an exploded perspective view of the exemplary sound and light apparatus illustrated in FIG. 1.

An exemplary embodiment of a sound and light apparatus 10 according to the present invention is illustrated in FIGS. 1–2. The sound and light apparatus 10 includes a housing 14. The housing 14 can be made from any suitable material such as, for example, fiberglass, metal, plastic, composite or refractory material. The housing 14 can be any shape or size, and is not limited to the embodiment shown in the drawings. By way of example only, the housing 14 can have a round, polygonal, irregular, or other cross-sectional shape, can be elongated, can be frusto-conical, or can take any other shape desired. The housing 14 can be generally described to have an upper portion 18 and a lower portion 22.

The housing 14 includes a plurality of fins 26 that can be positioned anywhere on the housing 14, and can be made from any suitable material, including any of the materials mentioned above with respect to the housing 14. The fins 26 can be integral with the housing 14 or attached to the housing 14 in any conventional manner. The fins 26 can be located on the housing 14 in sets of fins 26, such as those shown in the figures. Any number of fins 26 and any number of fin sets can be located on the housing 14. In the illustrated embodiment for example, the upper portion 18 of the housing 14 includes a set of fins 26 and the lower portion 22 also includes a set of fins 26. In other embodiments, a single set of fins 26 is located in the upper portion 18 and/or lower portion 22 of the housing 14. Any amount of the housing 14 can have fins 26 as desired.

The fins 26 can take any shape and be oriented in any manner desired, and in some embodiments extend generally outward from the housing 14. As illustrated in FIG. 1 for example, each fin 26 can extend circumferentially around the housing 14. In other embodiments, the fins 26 extend only partially around the housing 14. In this regard, two or more sets of fins 26 can be in different locations around the housing 14 as desired. In any case, for housings having multiple fins 14, the fins 26 can be positioned at any suitable distance apart from each other, and are not limited to the distance between the fins 26 as illustrated in the drawings. The fins 26 can be oriented substantially horizontally as shown or in any other orientation (e.g., vertically or diagonally).

The present invention also includes a lighting element or lamp 30. In some embodiments, the lamp 30 is at least 10 Watts, and is sufficiently powerful to illuminate an area around the housing 14. The lamp 30 can be a light bulb, such as a halogen, fluorescent, or incandescent light bulb, or any other suitable element or component employed for illuminating an area. The lamp 30 can be positioned anywhere in the housing 14. In particular, the lamp 30 can be located anywhere along the longitudinal axis of the housing 14 (in the case of vertical and/or elongated housings 14), such as in the upper or lower portions 18, 22 of the housing 14. Also, the lamp 30 need not necessarily be aligned with or located on a longitudinal axis of the housing 14 as shown. With reference to the housing 14 illustrated in the figures by way of example only, the lamp 30 can be centrally located in the upper portion 18 of the housing 14 as shown. In addition, the housing 14 can include more than one lamp 30. In the embodiment including a plurality of lamps 30, each lamp 30 can be a different intensity, different shape, and/or a different color.

The lamp 30 can be located in a section of fins 26 (described above) as shown by way of example in the figures. In FIG. 1, the lamp 30 is positioned at or near the section of fins 26 in the upper portion 18 of the housing 14, such that light is directed from the housing 14 through the fins 26 to the outside of the housing 14. In other embodiments, the lamp 30 is located a distance from the fins 26 but is positioned to shine light that exits the housing 14 through the fins 26. In the illustrated embodiment, the lamp 30 is directed substantially downward such that light exits in all directions from the sides of the housing 14, although other lamp orientations are possible and fall within the spirit and scope of the present invention.

The housing 14 and the fins 26 can be shaped to permit light to exit in any direction or combinations of directions from the housing 14. For this purpose, the fins 26 can be downwardly angled, upwardly angled, substantially horizontal, substantially vertical, or oriented in any other manner desired.

The present invention also includes a sound-producing element, such as a speaker 34. The speaker 34 in the illustrated exemplary embodiment has a front portion 36 that includes typical components such as a cone or diaphragm, dust cap, and basket. The speaker 34 also has a rear portion 38 that includes typical components such as a voice coil and magnet. However, any other sound-producing device can instead be employed, and falls within the term “speaker” as used herein and in the appended claims. In some embodiments, the rear portion 38 is located in a substantially enclosed chamber 42. The speaker 34 can be any size and type appropriate for the housing 14 and for the particular application of the invention (e.g., for the desired volume and frequency range of the apparatus 10). In the illustrated embodiment, for example, the speaker 34 is a mid-frequency range speaker about 4 inches in diameter with a power rating of 25 Watts RMS. As other examples, the speaker 34 can instead be a woofer or a tweeter. In some embodiments, the invention includes multiple speakers 34 that can be the same or different from each other.

The speaker 34 can be positioned anywhere in the housing 14. In particular, the speaker 34 can be located anywhere along the longitudinal axis of the housing 14 (in the case of vertical and/or elongated housings 14), such as in the upper or lower portions 18, 22 of the housing 14. Also, the speaker 34 need not necessarily be aligned with or located on a longitudinal axis of the housing 14 as shown. With reference to the housing 14 illustrated in the figures by way of example only, the speaker 34 can be centrally located in the upper portion 18 of the housing 14 as shown.

The speaker 34 can be located adjacent a section of fins 26 (described above) as shown by way of example in the figures. In FIG. 1, the speaker 34 is positioned along the housing 14 adjacent a set of fins 26, and is in a generally central vertical location in the housing 14. Also, the speaker 34 in the illustrated exemplary embodiment is positioned and oriented such that sound is directed from the housing 14 through the fins 26 to the outside of the housing 14. In this embodiment, the speaker 34 is directed substantially downward such that sound exits in all directions from the sides of the housing 14, although other speaker orientations are possible and fall within the spirit and scope of the present invention.

In some embodiments, the speaker 34 is located within a set of fins 26 or is located a greater distance from a set of fins 26 than that shown in the figures. Also, although the speaker 34 in the illustrated exemplary embodiment is associated with a set of fins 26 through which sound from the speaker 34 passes, in some embodiments the speaker 34 is not associated with fins 26. In such embodiments, sound can exit the housing 14 in any other manner.

The housing 14 and the fins 26 can be shaped to permit sound to exit in any direction or combinations of directions from the housing 14. For this purpose, the fins 26 can be downwardly angled, upwardly angled, substantially horizontal, substantially vertical, or oriented in any other manner desired.

The speaker 34 and lamp 30 of the present invention can be located in the housing 14 in any relationship with respect to one another. For example, the lamp 30 in the illustrated embodiment is located above the speaker 34, although in other cases the speaker 34 can be located above the lamp 30. Still other positional relationships between the lamp 30 and speaker 34 are possible, each of which fall within the spirit and scope of the present invention.

Some embodiments of the present invention can include an acoustic reflector 40 shaped to distribute sound emitted from the speaker 34 to one or more areas around the apparatus 10. The acoustic reflector 40 is located in the housing 14 in the path of sound waves emitted by the speaker 34, and can take any shape suitable to deflect and/or reflect sound prior to exiting the apparatus 10. By way of example only, the acoustic reflector 40 in the exemplary embodiment is cone- or funnel-shaped, and is positioned in the lower portion 22 of the housing 14 and below the speaker 34. This acoustic reflector 40, when positioned in the housing 14, is narrower nearest the speaker 34 and gradually widens as the acoustic reflector 40 extends toward the ground. The acoustic reflector 40 can, at its widest point, be the size of the circumference of the housing 14, or any other suitable size. In some embodiments, the acoustic reflector 40 is positioned inside the housing 14 at or near fins 26 such that sound is directed downward from the speaker 34, reflected off the acoustic reflector 40, and further directed through the fins 26 and outward from the housing 14. In other embodiments, sound passes in other directions based at least in part upon the orientation of the speaker 34 (e.g., upward), the acoustic reflector 40 and the fins 26.

Figure 3:
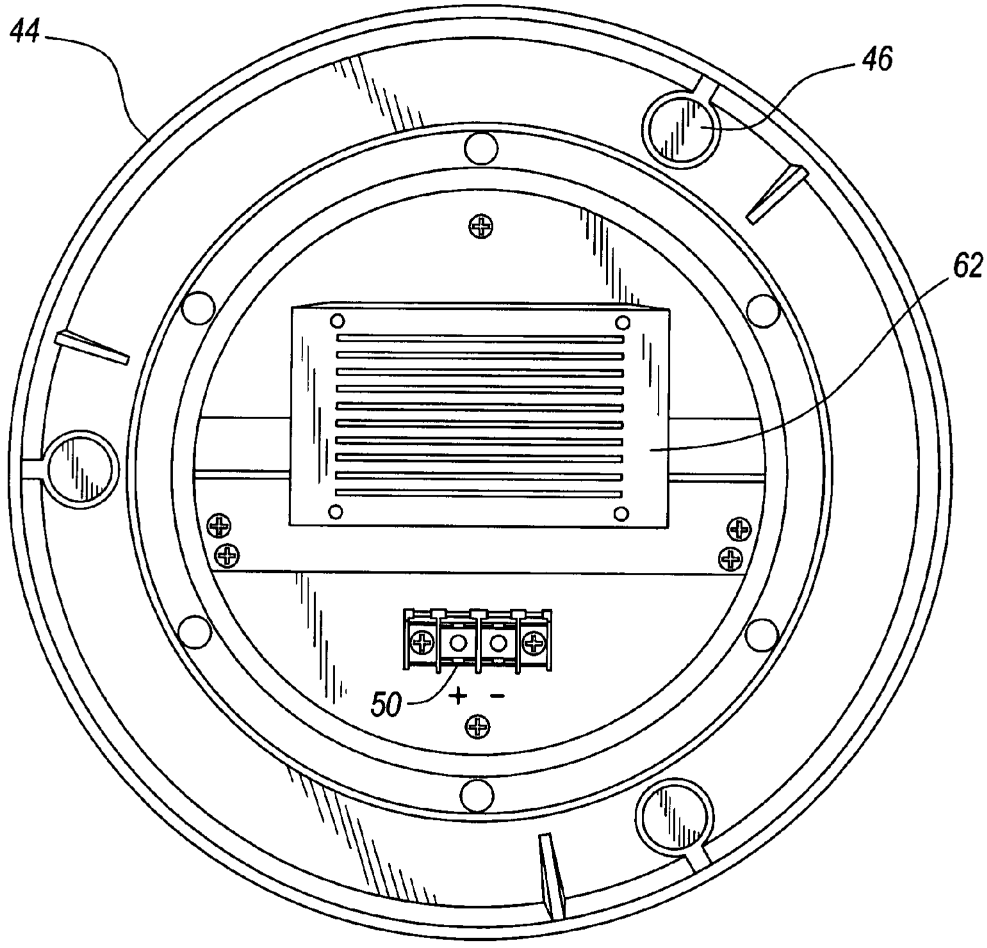
FIG. 3 is a bottom view of the exemplary sound and light apparatus illustrated in FIGS. 1 and 2.

As illustrated in FIG. 3, the housing 14 can include a base 44 to support the housing 14. The base 44 can be made from any suitable material such as, for example, any of the materials mentioned above with respect to the housing 14, and can be integral with or attached to the housing 14 in any suitable manner. The base 44 can include holes or apertures 46 for mounting the base to the ground, deck, concrete, plastic, stone, wood, or any other material. The base 44 can also include a terminal or a plurality of terminals 50 to receive a wire or wires 54 (illustrated in FIG. 2) to power the speaker 34 and wire or wires 58 (also illustrated in FIG. 2) that power the lamp 30. The terminal(s) 50 can also be configured to connect or daisy-chain one sound and light apparatus 10 to another sound and light apparatus 10, or one sound and light apparatus 10 to another similar type of device contemplated by the invention.

The base 44 can also include a compartment 62 (shown with cover) for housing an optional transformer (not shown) for low voltage lighting. The transformer could instead be located in other locations, such as inside a building or in an enclosure separate from the housing 14, if not housed in the compartment 62 or elsewhere in the base 44 or housing 14.

In some embodiments, the lamp 30 and/or the speaker 34 include wires 66 and 70, respectively (illustrated in FIG. 2) that connect to the terminal(s) 50 in the base 44, such that power is provided to the lamp 30 and/or the speaker 34. The wires 58 connect to an outlet 74 (illustrated in FIG. 4) providing a power source, such as a low voltage alternating current source (12 VAC) or a higher voltage power source as desired. The apparatus 10 can be adapted to be powered by any power source, e.g., solar power, direct current ("DC") power, or alternating current ("AC") power, and the like. The outlet 74 can provide a dimming feature to adjust the amount of light emanating from the lamp 30. The wires 54 connect to a sound-producing source such as a stereo amplifier/receiver 78 (illustrated in FIG. 4), and can be connected thereto via a controller 82. The controller 82 can control the volume of the sound produced by the speaker(s) 34, the sound generated by each speaker 34, and which speaker(s) 34 are on/off if using multiple sound and light apparatuses 10.

Figure 4:
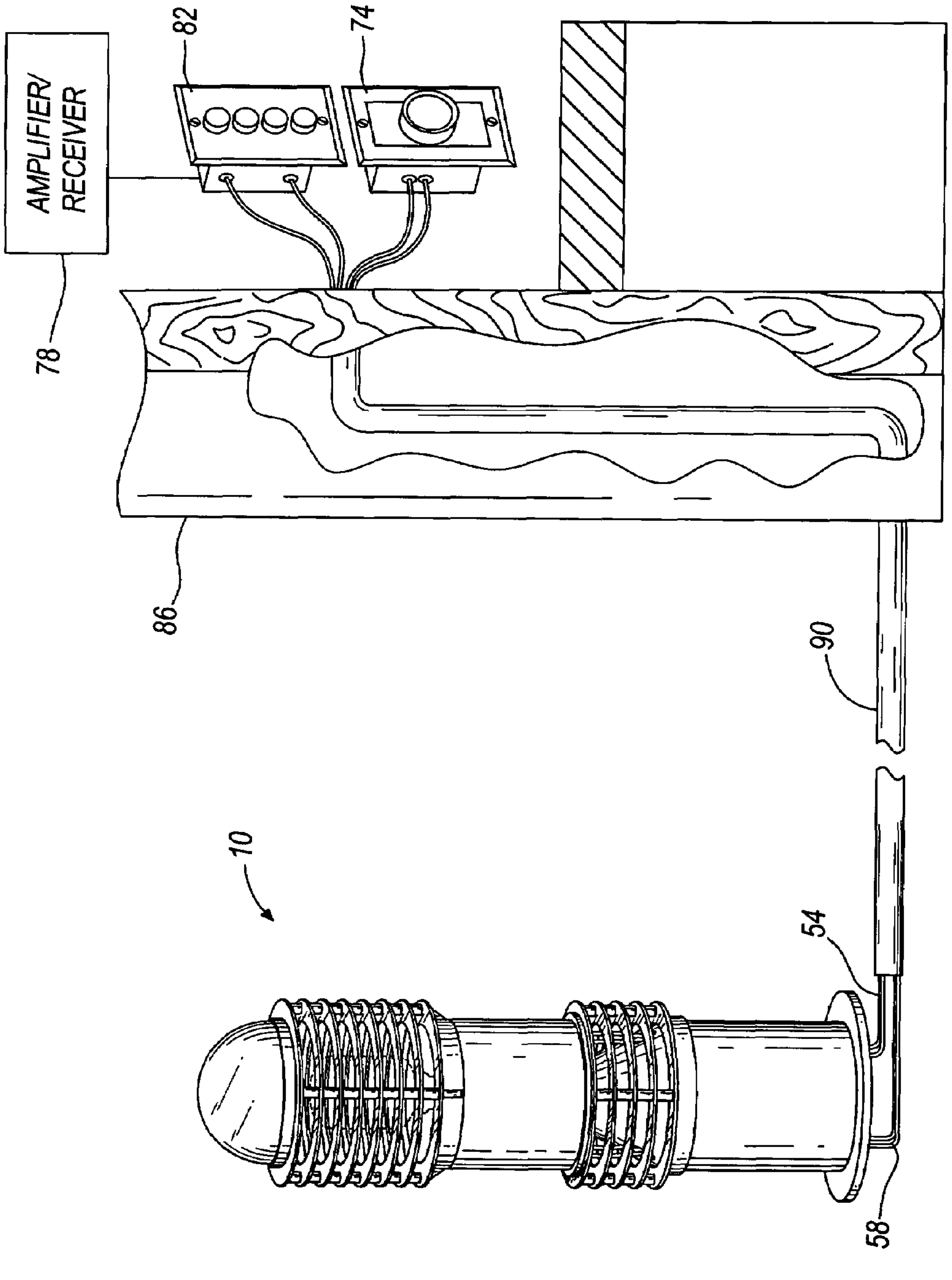
FIG. 4 is a perspective view of the exemplary sound and light apparatus illustrated in FIGS. 1 and 2, shown with associated electrical connections to electrical controls.

Generally, the outlet 74, the stereo 78, and the controller 82 can be located inside a house or building 86 (partially illustrated in FIG. 4). However, the outlet 74, the stereo 78, and/or the controller 82 could instead be located outside of the building 86 as well. If the sound and light apparatus 10 is used outdoors, generally, the wires 54 and 58 can be run underground, such as in a conduit 90 to the building 86 (and to the controller 82 and outlet 74, if desired). The conduit 90 can be made from plastic, metal, or any other suitable material. The conduit 90 can also run above ground as desired.

If the sound and light apparatus 10 is used indoors, the wires 54 and 58 can run behind interior walls, beneath flooring, within ceilings, on the ground, under carpet, etc. to the outlet 74 and controller 82 or directly to the stereo 78. Depending at least in part upon the type of equipment to which the apparatus 10 is connected, the controller 82 may not need to be used.

Figure 5:
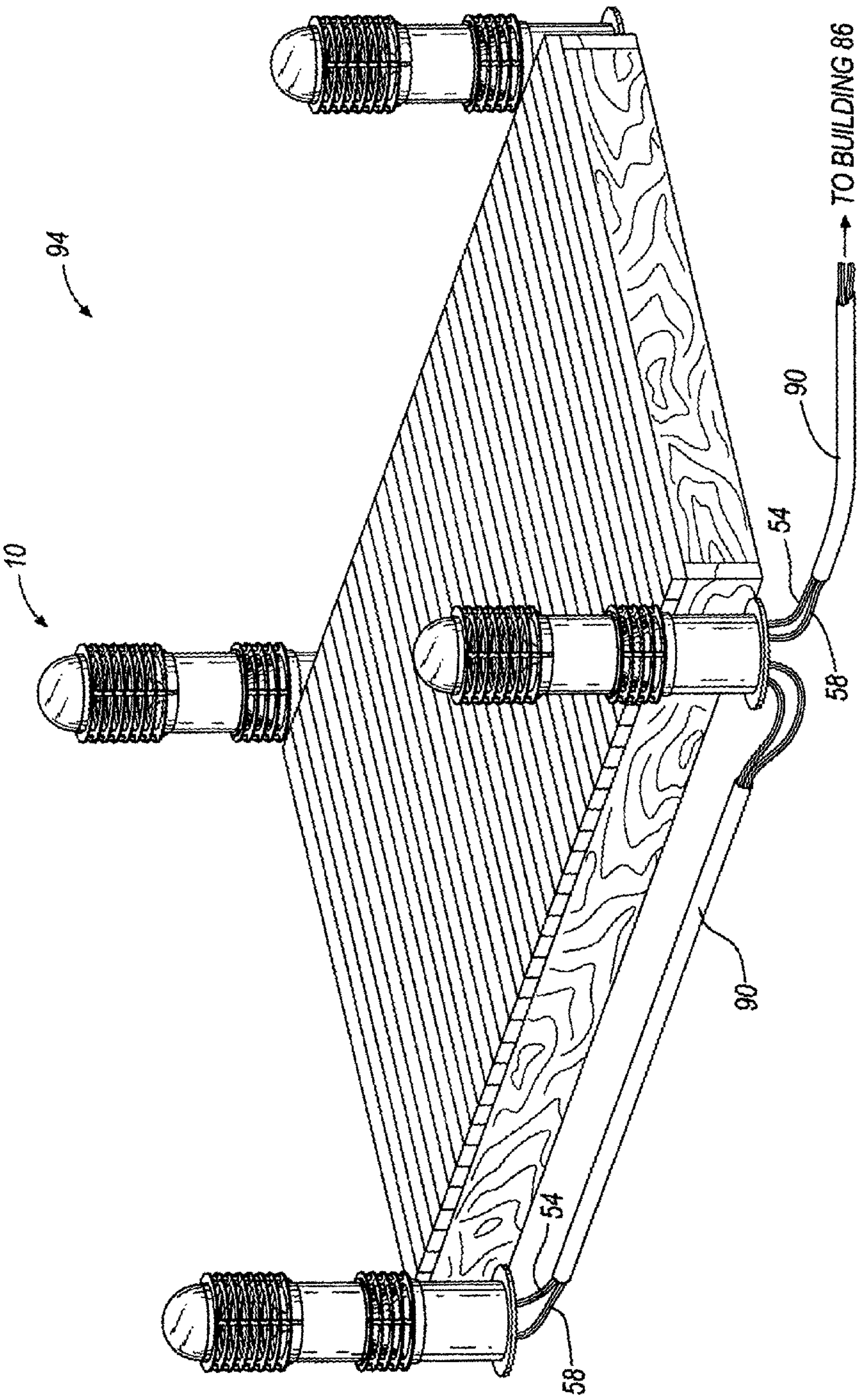
FIG. 5 is a perspective view of an outdoor entertainment system employing a number of the exemplary sound and light apparatuses illustrated in FIGS. 1 and 2.

In another embodiment, illustrated in FIG. 5, multiple sound and light apparatuses 10 are used to create an entertainment system 94. The entertainment system 94 could be arranged indoors or outdoors. Each sound and light apparatus 10 can be connected to at least one other sound and light apparatus 10. In the system 94, two or more apparatuses 10 can be connected in series, wherein each apparatus 10 connects to one or more additional apparatuses 10. In other embodiments, each apparatus 10 is separately connected to the outlet 74 and/or controller 82. In still other embodiments, a system employs two or more apparatuses 10 connected in series and two or more apparatuses 10 connected in parallel. The apparatuses 10 can be connected in any other pattern, including a pattern where one or more apparatuses 10 connect to additional apparatuses 10. As discussed above, each sound and light apparatus 10 can have at least one terminal 50 (illustrated in FIG. 3) enabling such connectivity. In those embodiments in which one apparatus 10 is directly connected to a neighboring apparatus 10, such a connection can be made by linking wire or wires from one terminal 50 to the next terminal 50 on the neighboring sound and light apparatus 10. At least one of the sound and light apparatuses 10 is connected to the outlet 74 and stereo 78 or controller 82 to control or adjust the light and sound emanating from the sound and light apparatuses 10. Alternatively, multiple stereos and/or controllers can be employed for a set of apparatuses 10 such that each sound and light apparatus 10 can be individually controlled or adjusted.

In some embodiments, a plurality of apparatuses 10 can be controlled by a single stereo system 78. The stereo system 78 can include a home theater audio/video receiver. Generally, the home theater audio/video receiver includes audio/video inputs for video sources, e.g., DVD player, VCR, a preamplifier, a surround-sound decoder, power amplifiers for each sound channel, and outputs for speakers. The audio component from the source is supplied to the decoder, which separates the different sound channels in the audio signal, and sends the information to the amplifiers for each sound channel output. The amplifiers are connected to the appropriate speaker or speakers such that each speaker 34 receives a different sound channel to produce a different sound. When the apparatuses 10 are positioned around an area, surround sound is produced to enhance the listening experience.

In some embodiments of the present invention, the lamp 30 can be responsive to the sound produced by the speaker 34 by changing intensity, e.g., turning on/off, dimming and/or brightening. The lamp 30 can be connected to a sound channel for response to a frequency or range of frequencies received by the speaker 34. In those embodiments in which two or more lamps 30 are located within the housing 14 as described above, each lamp 30 can be connected to a corresponding sound channel for response to the same or different frequencies or ranges of frequencies received by the speaker 34. Other modes of connection between the stereo system 78, speaker(s) 34 and lamp(s) 30 to achieve a particular sound/lighting effect are also contemplated by the invention. In some embodiments, each sound and light apparatus 10 in an entertainment system 94 can include a different colored light (or shine through a lens or other colored object) that is responsive to the sound produced by the speaker 34 by changing intensity.

As can be seen from the above, several embodiments of the invention provide a sound and light apparatus 10. The sound and light apparatus 10 can be used indoors or outdoors to provide sound and light to an area. For example, the sound and light apparatus 10 can be used in a landscaping design to enhance the outdoor ambiance around a patio, pool, or deck. The sound and light apparatus 10 can also be used in an interior design plan to enhance a den, bedroom, office, or any other room of a house or building. In some embodiments, multiple sound and light apparatuses 10 can be connected together for enhanced effect.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An outdoor illumination apparatus, comprising:

a housing;

a speaker mounted in the housing;

a lamp mounted in the housing, the housing including a first plurality of outwardly extending fins positioned to direct light from the lamp; and an acoustic reflector positioned below the speaker and within a sound wave path, the housing including a second plurality of outwardly extending fins positioned circumferentially around the acoustic reflector to direct sound from the speaker.

2. An outdoor illumination apparatus according to claim 1, wherein the housing includes an upper portion and a lower portion, and wherein the speaker is positioned in the lower portion and the lamp is positioned in the upper portion.

3. An outdoor illumination apparatus according to claim 2, further comprising an acoustic reflector mounted in the lower portion of the housing.

4. An outdoor illumination apparatus according to claim 3, wherein the acoustic reflector is generally cone-shaped, and wherein the speaker is positioned above the acoustic reflector.

5. An outdoor illumination apparatus according to claim 1, wherein the first plurality of outwardly extending fins and the second plurality of outwardly extending fins extend circumferentially about the housing.

6. An outdoor illumination apparatus according to claim 1, further comprising a base positioned to support the housing over a surface.

7. An outdoor illumination apparatus according to claim 6, wherein the base includes an electrical terminal for providing power to the speaker.

8. An outdoor illumination apparatus according to claim 6, further comprising a transformer mounted in the base.

9. An outdoor illumination apparatus according to claim 6, wherein the base includes an electrical terminal that connects to at least one additional outdoor illumination apparatus to define a multi-speaker sound system.

10. An outdoor illumination apparatus according to claim 9, further comprising a controller coupled to the system, wherein the controller controls the sound produced by the speaker at least partially independently of at least one additional outdoor illumination apparatus.

11. An outdoor illumination apparatus according to claim 1, wherein the speaker has a front and a rear, and wherein the rear of the speaker is located in a substantially enclosed chamber.

12. An outdoor illumination apparatus according to claim 1, further comprising a controller coupled to the speaker, the controller remotely located from the housing.

* * * * *